United States Patent [19]

Higgins

[11] Patent Number: 4,729,705

[45] Date of Patent: Mar. 8, 1988

[54] INSERT FASTENER IN A LIGHTWEIGHT PANEL

[75] Inventor: William R. Higgins, Clearwater, Fla.

[73] Assignee: ATR International, Inc., Clearwater, Fla.

[21] Appl. No.: 9,966

[22] Filed: Feb. 2, 1987

[51] Int. Cl.$^4$ .................................................. F16B 39/02
[52] U.S. Cl. .................................... 411/82; 411/174; 411/180; 411/258
[58] Field of Search ............... 411/82, 174, 175, 180, 411/258, 427; 24/297; 52/806, 743

[56] References Cited

U.S. PATENT DOCUMENTS

| | | | |
|---|---|---|---|
| 3,130,503 | 10/1960 | Rosan | 411/180 X |
| 3,282,015 | 4/1962 | Rohe et al. | 411/258 X |
| 3,339,609 | 9/1965 | Cushman | 411/82 |
| 3,392,225 | 7/1968 | Phelan | 411/258 X |
| 3,461,936 | 8/1969 | Rosan, Sr. et al. | 411/180 |
| 3,884,006 | 5/1975 | Dietlein | 411/82 X |
| 3,918,130 | 11/1975 | Poe | 24/297 X |
| 4,063,582 | 12/1977 | Fischer | 411/82 |

FOREIGN PATENT DOCUMENTS 876106  8/1961  United Kingdom ................ 411/82

Primary Examiner—Gary L. Smith
Assistant Examiner—Curtis B. Brueske
Attorney, Agent, or Firm—Herbert W. Larson; Joseph C. Mason, Jr.

[57] ABSTRACT

An improved insert fastener for use in lightweight panels is described. The fastener has a flat circular head overlapping a hole in the panel. Integral with and depending from the head is a cylindrical body with a pair of radial flanges parallel to each other and to the head. The flanges are spaced apart from each other and the head. The edges of the flanges are serrated. A central threaded bore through the head and cylindrical body receives a bolt for holding auxiliary structures to the panel. Two holes, one on each side of the central bore, are present in the head to allow excess epoxy resin potting material to leave the hole in the lightweight panel.

5 Claims, 7 Drawing Figures

INSERT FASTENER IN A LIGHTWEIGHT PANEL

BACKGROUND OF THE INVENTION

1. Field of The Invention

This invention relates to potted fasteners for cellular panels. More particularly, it refers to molded insert fasteners for potting into a preformed hole in a honeycomb core structure.

2. Description of The Prior Art

The use of potted fasteners for securing attachments to cellular honeycomb panels is well known. U.S. Pat. No. 3,339,609 describes a multi-component unit mounted with a resin in a preformed hole. This unit requires a throw-away retainer cap for holding the insert fastener in the hole while the resin is being injected. U.S. Pat. No. 3,646,981 describes an insert fastener with helical exterior ribs. U.S. Pat. No. 3,709,733 describes an insert fastener with coarse external threads. This insert requires a bolt and washer to secure the insert in its hole prior to curing of the mounting resin.

U.S. Pat. No. 3,884,006 describes an insert with axially spaced non-grooved heads. Such an insert when tested with an Instron device exhibits shear load and individual panel pull out loads less than the fastener of the present invention in direct comparison tests. U.S. Pat. No. 3,964,531 describes an insert with a self-contained cutting head, but insufficient exterior surface area for bonding with epoxy resins.

Other references such as U.S. Pat. Nos. 3,564,798; 3,742,673 and 4,296,586 describe insert fasteners that are employed with holes penetrating the entire honeycomb structure and wherein a nut and bolt is employed.

While the heretofore described prior art insert fasteners all have anchoring properties in honeycomb panels, they suffer one or more limitations such as low pull out or turning resistance, high cost or time consuming mounting procedure. An insert fastener is needed which has high load resistance to pull out and turning, is easy to manufacture and can be quickly mounted in a honeycomb panel.

SUMMARY OF INVENTION

I have invented an improved fastener for mounting in a preformed hole in a lightweight panel. This improved fastener has greater resistance to pull out or turning than heretofore described fasteners. This fastener is quickly installed and requires no special tools.

My fastener has an outer flat circular head designed to overlap the preformed hole in the lightweight panel and fit flush with the interior surface of the panel. Depending from the head and integral therewith is a cylindrical body having a pair of radial flanges with serrated edges. The flanges are parallel to and spaced apart from the head and each other. A central threaded bore runs through the head and cylindrical body but does not exit the bottom of the cylindrical body. The bore is designed to receive a panel mounting bolt. There are spaced apart holes in the head on each side of the central bore. Excess epoxy potting material exits from the two holes.

BRIEF DESCRIPTION OF THE DRAWINGS

The present invention may be best understood by those having ordinary skill in the art by reference to the following detailed description when considered in conjunction with the accompanying drawings in which.

DETAILED DESCRIPTION OF THE INVENTION

Figure 1:
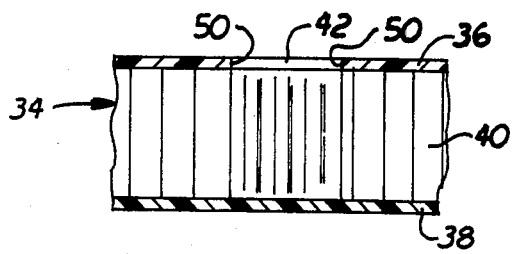
FIG. 1 is an elevation view in section of a honeycomb structure and preformed hole.

Throughout the following detailed description, the same reference numerals refer to the same elements in all figures.

Figure 3:
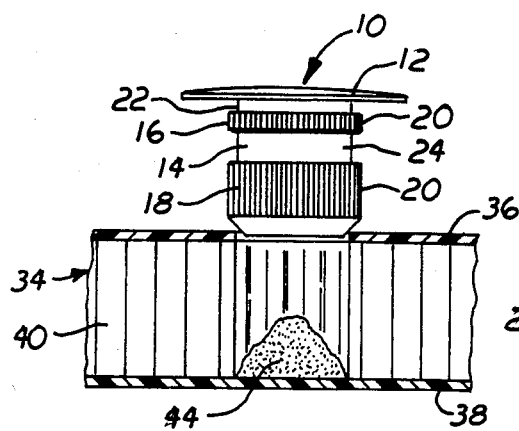
FIG. 3 is a side view in elevation of the insert fastener about to be inserted into the hole as shown in FIGS. 1-2.
Figure 4:
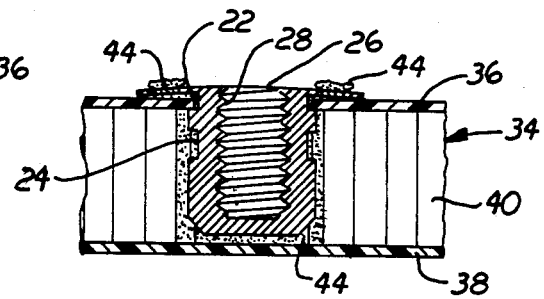
FIG. 4 is an elevation view in section of the insert fastener mounted in the hole.

The insert fastener 10 shown in FIG. 3 has an outer head 12 in the form of a flat circular flange and has depending from it a cylindrical body 14 from which a first radial flange 16 and a second radial flange 18 with serrated edges 20 project outward. The radial flanges 16 and 18 are parallel to the head 12 but are spaced apart from the head and each other. Throat 22 separates radial flange 16 from the flat head 12 and belly 24 separates the radial flange 16 from radial flange 18.

The flat head 12 of the insert fastener 10 has a central bore hole 26 which has threads 28 therein. The bore hole penetrates through to near the bottom of the cylindrical body 14. However, the bottom of cylindrical body 14 is not pierced. On each side of the central bore hole 26 is a hole 30 and 32.

The insert fastener 10 is used to provide a means for mounting elements into a honeycomb structure panel 34. The panel 34 has an upper skin 36 and lower skin 38 which enclose a honeycomb interior 40. Other layers may also be present such as composed dampening materials. A bore hole 42 is drilled into the panel 34 through upper skin 36 and through the honeycomb panel interior 40. The lower skin 38 is not penetrated. The diameter of the hole is slightly less than the diameter of the radial flanges 16 and 18 in the insert fastener 10.

Figure 2:
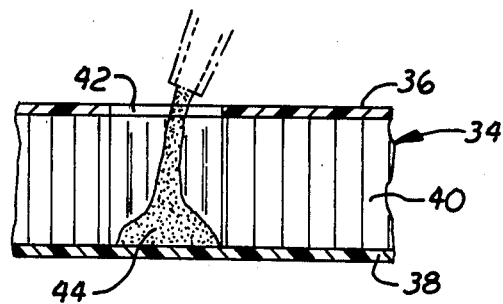
FIG. 2 is a view of epoxy being inserted into the hole of FIG. 1.

The hole is filled with a quick setting resin material such as an epoxy 44 as shown in FIG. 2. The insert fastener 10 is pushed into bore hole 42 containing the epoxy 44.

Insertion of fastener 10 into the bore hole 42 containing the epoxy 44, will cause some of the excess epoxy to emanate from side holes 30 and 32. This epoxy is wiped away. Thereafter the insert fastener 10 is turned approximately 180 degrees and pushed so that the head 12 is approximately flush with the upper skin panel 36. The turning motion will cause additional epoxy to appear on the edge of the head 12. This epoxy must also be wiped away.

Following the procedures set forth above, the strength of the upper and lower skin in the panel is utilized to form a cellular unit without damaging the surrounding construction of the honeycomb 40. The invention enables a far stronger fastener installation to be made with less labor and equipment and affects considerable savings in the quantity of epoxy potting compound employed. The initial insertion of the insert fastener 10 into bore hole 42 containing the epoxy 44 causes the edge 50 of the hole 42 to be pressed back but it snaps back into shape along the throat 22 which is of lesser diameter than radial flange 16. This holds the fastener in position until the epoxy solidifies, eliminating the need for temporary clamping attachments.

It is important to note that the cavity 42 drilled to receive the fastener 10 does not have to be grouted between the upper and lower skins 36 and 38.

Pushing the fastener 10 into the cavity 42 displaces the epoxy compound 44 around the fastener body 10 and most essentially assures a film of epoxy sandwiched between the fastener 10 bottom 48 and the lower skin 38. In addition, as the honeycomb core has not been damaged beyond the boundary of the cavity 42, the epoxy compound 44 is distributed between the upper and lower skins 36 and 38 and the flange head of the fastener forming a large area of adhesion.

The fastener 10 is raised by the hydraulic action of the epoxy 44 to the extent of the throat dimension 22 but is returned to a position flush with skin 36 by pushing the fastener back with the half turn movement.

The adhesion of fastener 10 to the upper and lower skins provides a maximum holding strength possible. The thickness of the head 12 is nominal to present an imperceptible defacement to the panel upper skin 36.

A bolt 44 compatible with the threaded central bore hole 26 is screwed into the insert fastener 10 through an accessory device 46. When tightened down, the accessory device 46 is held securely in place. Such an accessory can include luggage racks, kitchen devices, air conditioning lines, and the like.

Figure 5:
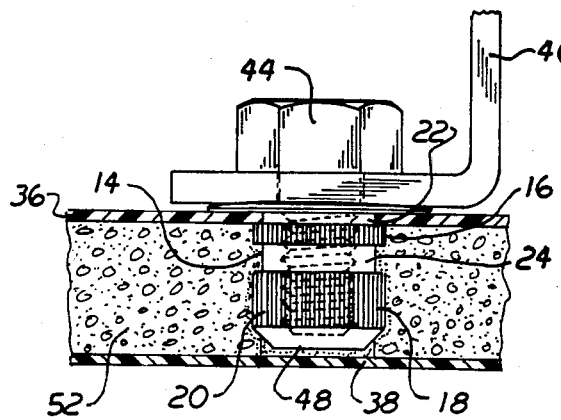
FIG. 5 is an elevation view in section of the insert fastener mounted as in FIG. 4 but in a stiff foam material with the addition of a bolt and accessory member in place.
Figure 7:
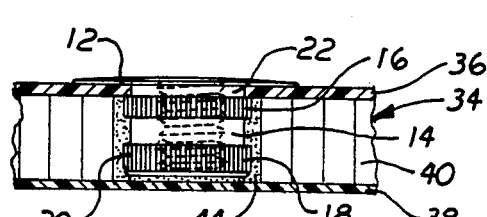
FIG. 7 is an elevation view of a different thickness honeycomb panel and shorter fastener employed.
Figure 6:
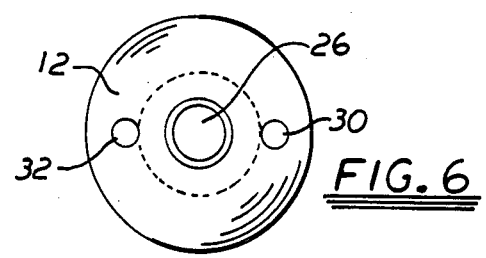
FIG. 6 is a plan view of the insert fastener mounted on a panel.

Other resins and various metals or plastics can be used for the manufacture and stamping out of the insert fastener 10. Typical metals used are: aluminum alloy, stainless steel and titanium. Other cellular materials such as as stiff foam 52, (FIG. 5) can be substituted for the honeycomb employed in the lightweight panel of this invention. The skin material 36 and 38 in the upper and lower surfaces can comprise numerous flexible materials such as aluminum, stainless steel, boron, carbon fiber, fiberglass and Kevlar ®.

Other substitutions of equivalent materials can be employed without departing from the substance of this invention.

Having thus described the invention what is claimed and desired to be secured by Letters Patent is:

1. An insert fastener permanently mounted within a preformed hole in a lightweight panel having a lightweight core comprising:
    (a) an outer head in the form of a flat circular flange for overlapping the preformed hole;
    (b) an integral cylindrical body depending from the outer head having a pair of radial flanges with serrated edges, the flanges being parallel to and spaced apart from the outer head and each other;
    (c) a central threaded bore through the outer head and a portion of the cylindrical body; and
    (d) spaced apart holes in the outer head on each side of the central bore, the diameter of the parallel radial flanges being less than the distance between an outer edge of the two holes and slightly more than the diameter of the preformed hole.

2. An insert fastener according to claim 1 mounted within a preformed hole containing epoxy resin.

3. An insert fastener according to claim 1 wherein the radial flanges are of substantially equal diameter.

4. An insert fastener according to claim 1 wherein the fastener is an aluminum alloy.

5. An insert fastener according to claim 1 wherein the fastener is stainless steel.

* * * * *